(12) United States Patent
Foster et al.

(10) Patent No.: US 10,260,374 B2
(45) Date of Patent: Apr. 16, 2019

(54) COMPOSITE FLANGE FROM BRAIDED PREFORM

(71) Applicant: United Technologies Corporation, Hartford, CT (US)

(72) Inventors: Larry Foster, South Glastonbury, CT (US); Darin S. Lussier, Guilford, CT (US)

(73) Assignee: United Technologies Corporation, Farmington, CT (US)

( * ) Notice: Subject to any disclaimer, the term of this patent is extended or adjusted under 35 U.S.C. 154(b) by 679 days.

(21) Appl. No.: 14/875,627

(22) Filed: Oct. 5, 2015

(65) Prior Publication Data

US 2016/0024969 A1   Jan. 28, 2016

Related U.S. Application Data

(62) Division of application No. 13/618,081, filed on Sep. 14, 2012, now Pat. No. 9,149,997.

(51) Int. Cl.
   *F01D 25/24*   (2006.01)
   *B32B 5/08*   (2006.01)
   (Continued)

(52) U.S. Cl.
   CPC .......... *F01D 25/24* (2013.01); *B29C 70/222* (2013.01); *B32B 1/08* (2013.01); *B32B 5/08* (2013.01); *B32B 5/26* (2013.01); *B65H 81/02* (2013.01); *D04C 1/00* (2013.01); *F01D 21/045* (2013.01); *F01D 25/243* (2013.01); *F02C 7/04* (2013.01); *F02K 1/78* (2013.01); *F04D 29/023* (2013.01); *F04D 29/40* (2013.01); *F04D 29/522* (2013.01); *F05D 2220/32* (2013.01); *F05D 2220/36* (2013.01); *F05D 2230/30* (2013.01); *F05D 2300/603* (2013.01); *F05D 2300/6012* (2013.01); *Y02T 50/672* (2013.01); *Y10T 428/13* (2015.01)

(58) Field of Classification Search
   CPC ...... F04D 29/023; F04D 29/40; F04D 29/522; F01D 25/24; B29C 70/222; F02C 7/04; B32B 1/08; B32B 5/08; D04C 1/00
   See application file for complete search history.

(56) References Cited

U.S. PATENT DOCUMENTS

| | | |
|---|---|---|
| 5,619,903 A | 4/1997 | Rogers et al. |
| 5,783,279 A | 7/1998 | Edgson et al. |

(Continued)

FOREIGN PATENT DOCUMENTS

| | | |
|---|---|---|
| WO | WO2008149079 A2 | 12/2008 |
| WO | WO2012046021 A1 | 4/2012 |

(Continued)

*Primary Examiner* — Shaun R Hurley
(74) *Attorney, Agent, or Firm* — Kinney & Lange, P.A.

(57) ABSTRACT

A preform sheet for a composite component comprises a body section and a flange section. The preform body section includes a plurality of axial tows braided with at least a plurality of first bias tows and a plurality of second bias tows. The preform flange section includes a first braided flange layer and a second braided flange layer. The first braided flange layer is defined by the first and second braided bias tows of the preform body section extending into the flange section. Neither the first nor second braided flange layers have axial tows.

24 Claims, 7 Drawing Sheets

(51) Int. Cl.
  *B32B 1/08*   (2006.01)
  *D04C 1/00*   (2006.01)
  *F04D 29/40*  (2006.01)
  *F04D 29/02*  (2006.01)
  *F04D 29/52*  (2006.01)
  *B32B 5/26*   (2006.01)
  *B65H 81/02*  (2006.01)
  *F01D 21/04*  (2006.01)
  *F02K 1/78*   (2006.01)
  *F02C 7/04*   (2006.01)
  *B29C 70/22*  (2006.01)

(56) References Cited

U.S. PATENT DOCUMENTS

| | | |
|---|---|---|
| 5,976,662 A | 11/1999 | Pollard et al. |
| 7,132,027 B2 | 11/2006 | Jensen |
| 7,967,248 B2 | 6/2011 | Halme et al. |
| 8,006,601 B2 | 8/2011 | Inazawa et al. |
| 9,149,997 B2 * | 10/2015 | Foster .................. F04D 29/023 |
| 2009/0071594 A1 | 3/2009 | Johnson et al. |
| 2009/0098337 A1 | 4/2009 | Xie et al. |
| 2009/0193961 A1 | 8/2009 | Jensen et al. |
| 2010/0150706 A1 | 6/2010 | Xie et al. |
| 2010/0170990 A1 | 7/2010 | Wybrow |
| 2010/0322776 A1 | 12/2010 | Laurent |
| 2012/0177501 A1 | 7/2012 | Cairo et al. |
| 2012/0270006 A1 | 10/2012 | McMillan |
| 2013/0108823 A1 | 5/2013 | Beraud et al. |
| 2014/0255203 A1 | 9/2014 | Roby et al. |

FOREIGN PATENT DOCUMENTS

| | | |
|---|---|---|
| WO | WO2012049478 A1 | 4/2012 |
| WO | WO2012076875 A1 | 6/2012 |

\* cited by examiner

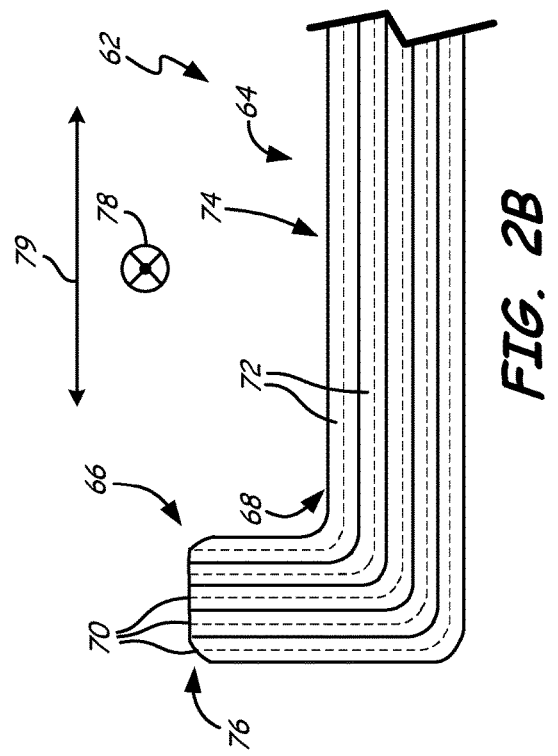
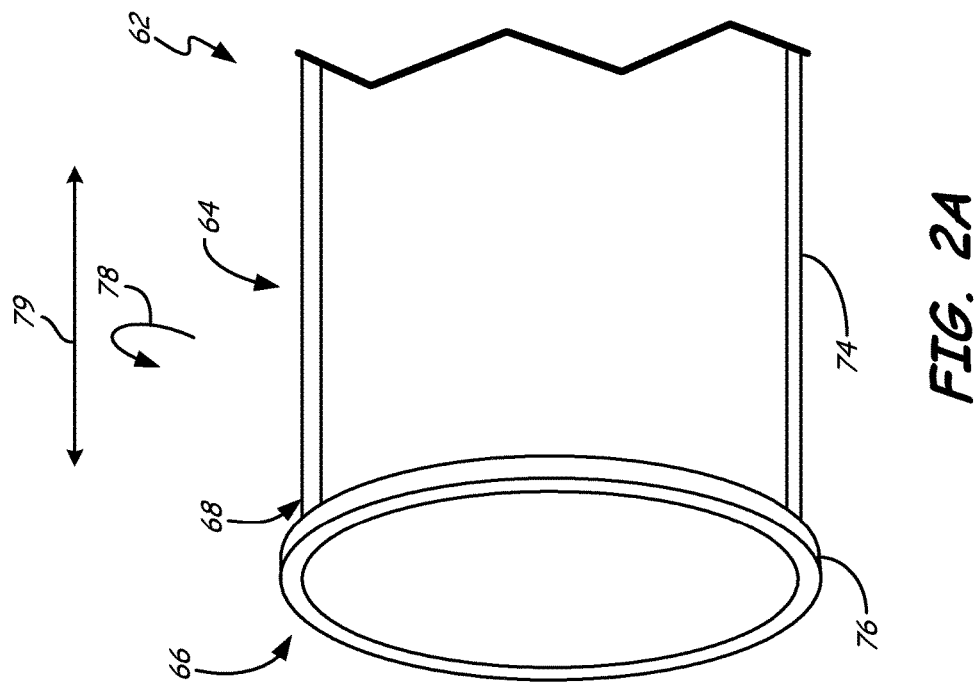

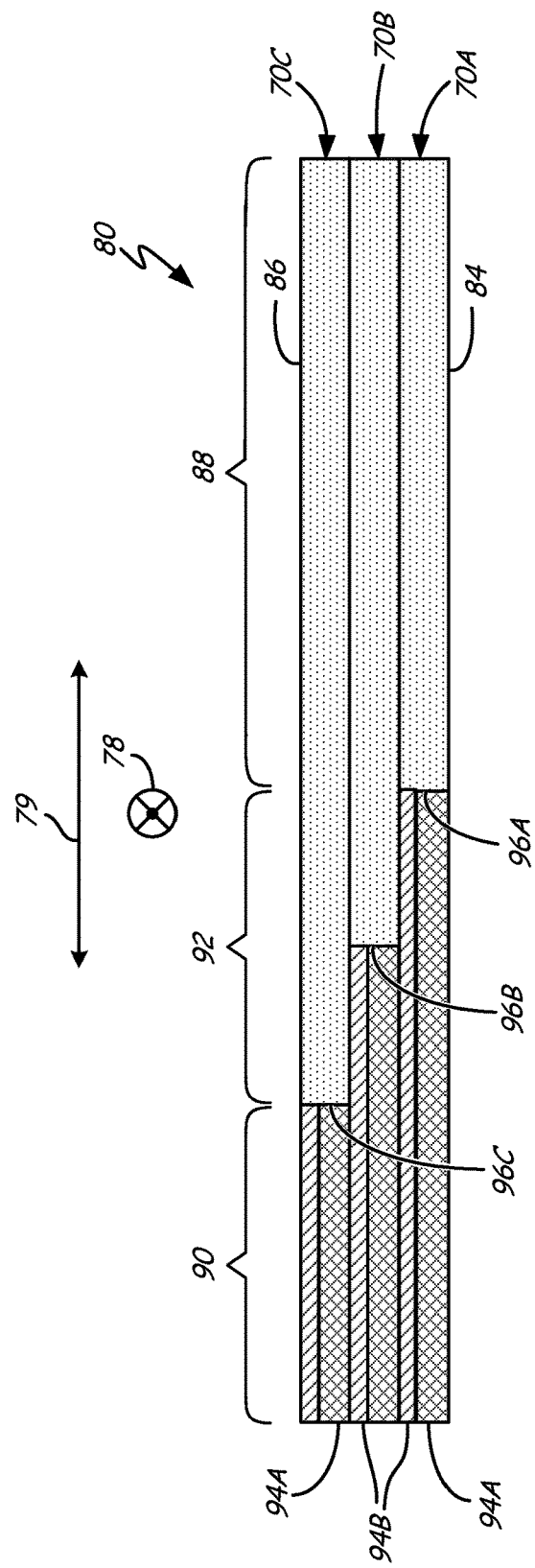

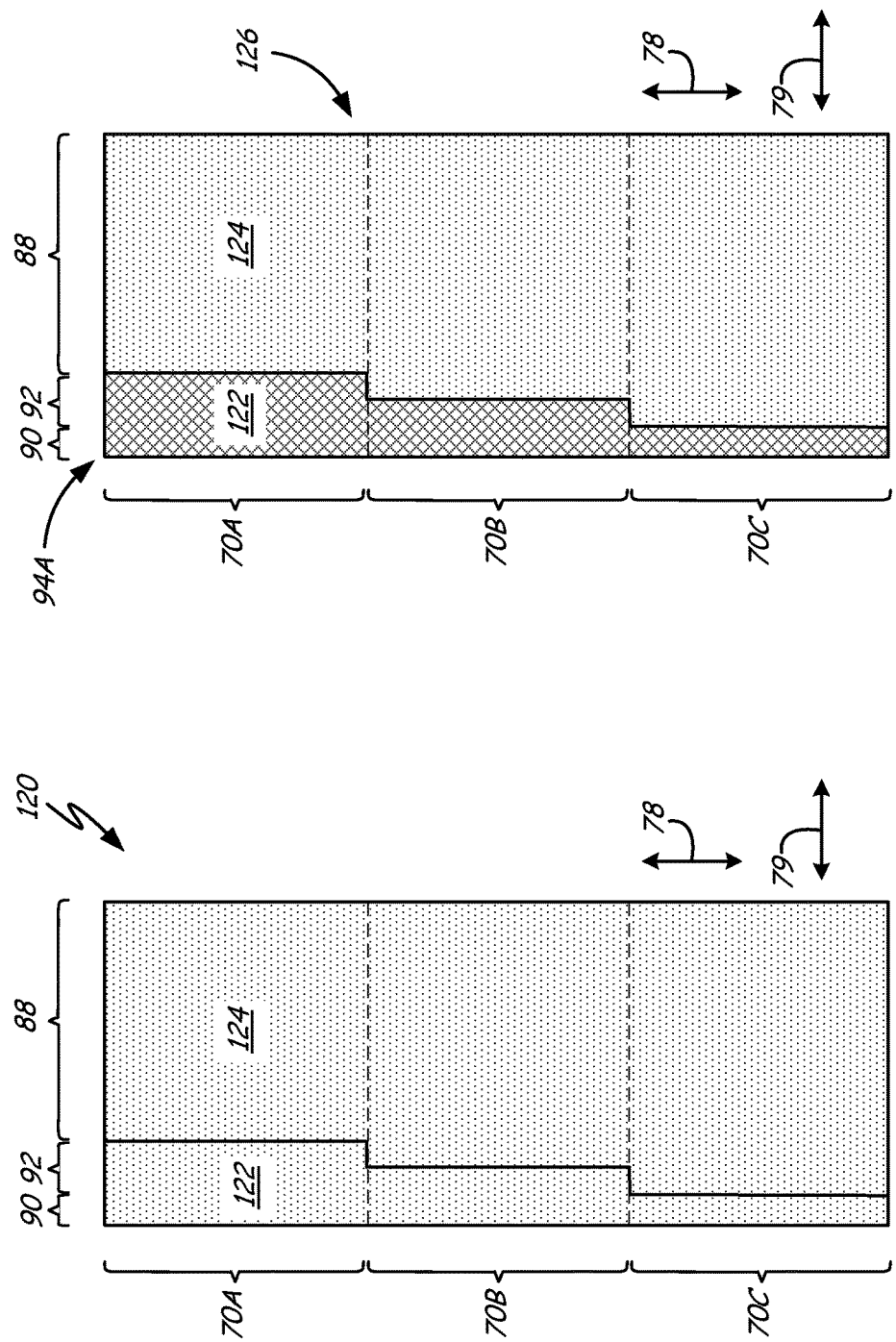

COMPOSITE FLANGE FROM BRAIDED PREFORM

CROSS-REFERENCE TO RELATED APPLICATION(S)

This application is a divisional of U.S. application Ser. No. 13/618,081 filed Sep. 14, 2012 for "Composite Flange from Braided Preform" by Larry Foster and Darin S. Lussier.

BACKGROUND

Flanges on cylindrical composite parts present certain design and manufacturing challenges, particularly when the part is made from a triaxial braid. The axial tows of the braid, when oriented in the hoop direction of the cylinder, preclude the formation of an up-turned flange since the continuous fibers in the axial tows cannot deform or stretch to conform to the larger diameter of the flange.

SUMMARY

A preform sheet for a composite component comprises a body section and a flange section. The preform body section includes a plurality of axial tows braided with at least a plurality of first bias tows and a plurality of second bias tows. The preform flange section includes a first braided flange layer and a second braided flange layer. The first braided flange layer is defined by the first and second braided bias tows of the preform body section extending into the flange section. Neither the first nor second braided flange layers have axial tows.

A gas turbine engine component comprises a tubular body section and a flange section. The tubular body section includes a plurality of fiber wraps encompassed within a matrix composition. The plurality of body section fiber wraps each include a plurality of axial tows braided with at least a plurality of first bias tows and a plurality of second bias tows. The plurality of axial tows are generally aligned along a component circumferential direction. The flange section includes a plurality of fiber wraps encompassed within the matrix composition. The plurality of flange section fiber wraps each include a first braided flange layer and a second braided flange layer. The first braided flange layer is defined by at least the first and second braided bias tows extending into the body section. Neither the first nor second braided flange layers have axial tows.

A method for making a fabric preform for a composite component comprises laying out a first article of fabric having a plurality of axial tows braided with at least a plurality of first bias tows and a plurality of second bias tows. The axial tows are removed from a first portion of the first article of fabric, leaving the first fabric portion braided absent an axial tow, and a second fabric portion braided with axial tows. A second article of fabric absent an axial tow is disposed along the first fabric portion to form a reinforced first fabric portion.

BRIEF DESCRIPTION OF THE DRAWINGS

FIG. 2A depicts an example flanged composite component for a gas turbine engine.

FIG. 2B shows a cross-section of the example flanged composite component.

FIG. 3A is an example of a braided fabric preform for use in making a flanged composite component.

FIG. 5A shows a first triaxially braided sheet of fabric which can be used to make a braided fabric preform for use in making a flanged composite component.

FIG. 5B depicts the first sheet of fabric with some axial tows removed to form a first biaxially braided portion and a second triaxially braided portion of the sheet.

DETAILED DESCRIPTION

Figure 1:
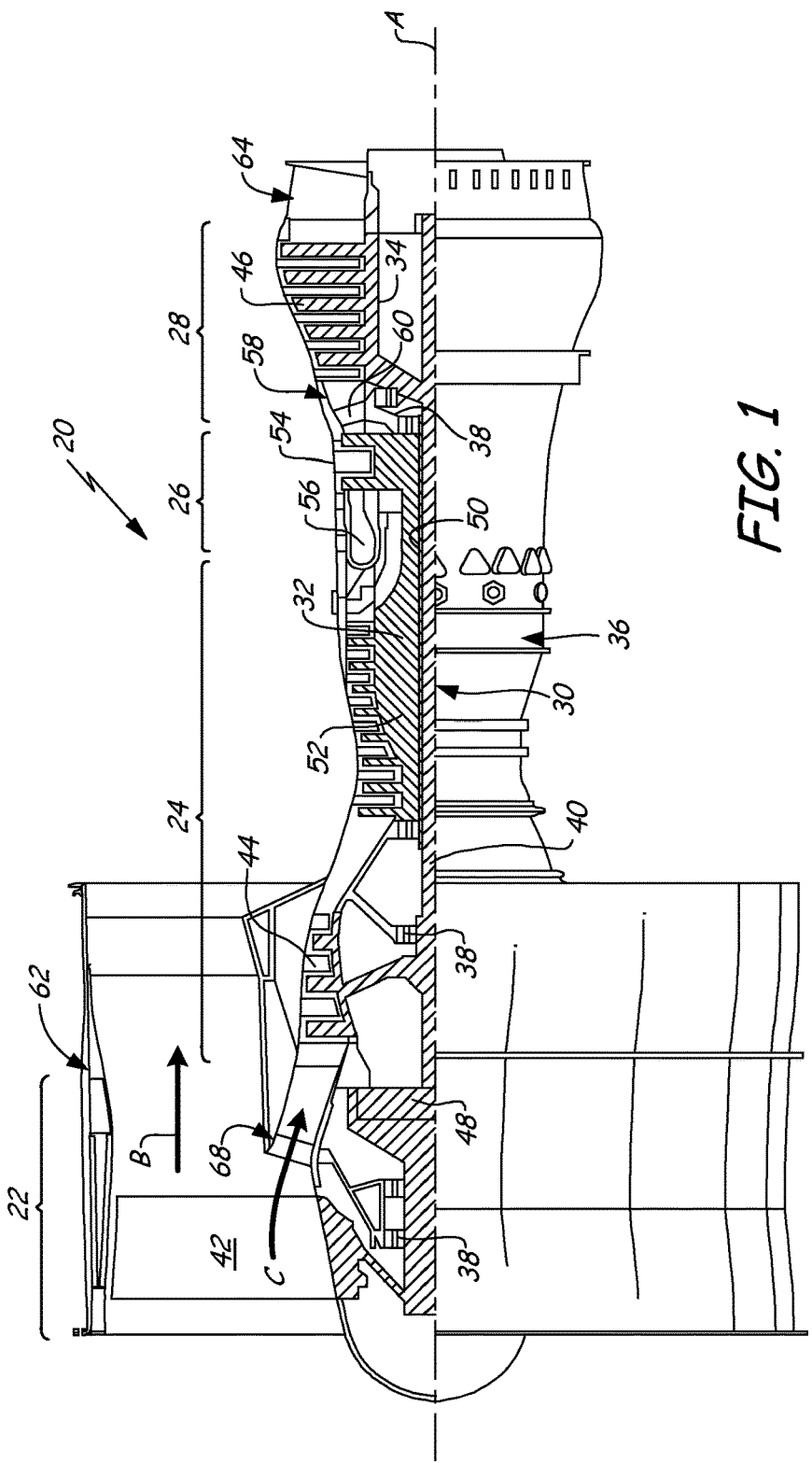
FIG. 1 schematically illustrates an example gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan directly, or via a gearbox, an intermediate spool that enables an intermediate pressure turbine to drive an intermediate compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 directly, or through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is an industry standard parameter of pound-mass ($lb_m$) of fuel per hour being burned divided by pound-force ($lb_f$) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram} °R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Fan section 22 can be surrounded by fan containment case 62, including a ballistic inner surface to absorb impacts from one or more fugitive fan blades in a blade-off condition, which may occur due to foreign object damage (FOD event).

Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

FIG. 2A shows a flanged portion of fan containment case 62, and FIG. 2B shows a cross-section of case 62. FIGS. 2A and 2B also include body section 64, flange section 66, transition section 68, wraps 70, matrix composition 72, body section outer diameter 74, flange section outer diameter 76, component circumferential direction 78, and component axial direction 79.

Fan containment case 62 includes a generally tubular (e.g. cylindrical or frustoconical) body section 64 and flange section 66 integrally joined to body section 64 via transition section 68. Flange section 66 is upturned relative to body section 64 such that flange section outer diameter 76 is greater than body section outer diameter 74. Alternatively, flange section outer diameter 76 can optionally be less than body section outer diameter 74 such that flange section 66 is downturned relative to body section 64. Optional transition section 68, disposed between the flange radius and body section 64, further reduces strain when forming the radius and flange as one integral component as compared to attaching a separate flange to the case.

In this example, case 62 is a composite material with a plurality of woven fibers encompassed within a matrix. Here, case 62 includes a plurality of braided fiber wraps 70 encompassed within a cured matrix composition 72. Each wrap 70 may be separate or they may be in a contiguous sheet. The woven fibers may be ceramic such as silicon carbide, or they may be carbon fibers. Additionally and/or alternatively, the woven fibers can include by way of non-limiting example, aramid (e.g., Kevlar®), fiberglass, polyethylene, etc. The fibers may be coated to improve adherence with the matrix, or they may be uncoated. The matrix may be ceramic, epoxy resin, or any other suitable material with appropriate mechanical characteristics. Fiber wraps 70 can be aligned with its braided fibers or tows in order to customize mechanical properties of case 62. There are some benefits to aligning axial tows (i.e., bundles of fiber arranged generally lengthwise along a fabric sheet) into a component circumferential direction 78. For example, this arrangement may increase hoop strength for larger components as compared to arranging the fibers in a component axial direction 79. In this illustrative example, sufficient hoop strength allows a fan containment case to absorb one or more blades lost in an FOD event as noted above. The case can then minimize blade ingestion and absorb blade-off energy without impaired load bearing capabilities. However, there are other shortcomings.

To simplify manufacturing, composite components may be manufactured using a single fabric preform comprising woven and braided tows. While smaller radius composite components (e.g. turbine shafts) often have axial tows aligned axially along the shaft, larger radius components, such as a fan containment case, are much more difficult to manufacture using an axially oriented preform. However, if the axial tows of the preform are arranged along the circumferential component direction, continuous fibers in the axial tows do not easily deform to conform to the changing diameter of an upturned or downturned flange. Removing the axial tows from the flange area of the preform can allow the remaining bias tows to easily shear and bend relative to one another. But removing the axial tows greatly reduces structural properties of the flange, including lower bearing strength, lower hoop strength, and lower stiffness. Manually inserting axial tows during layering and winding around the mandrel may be done, but this greatly impairs the manufacturing process, and can introduce defects (e.g. wrinkling).

Figure 3B:
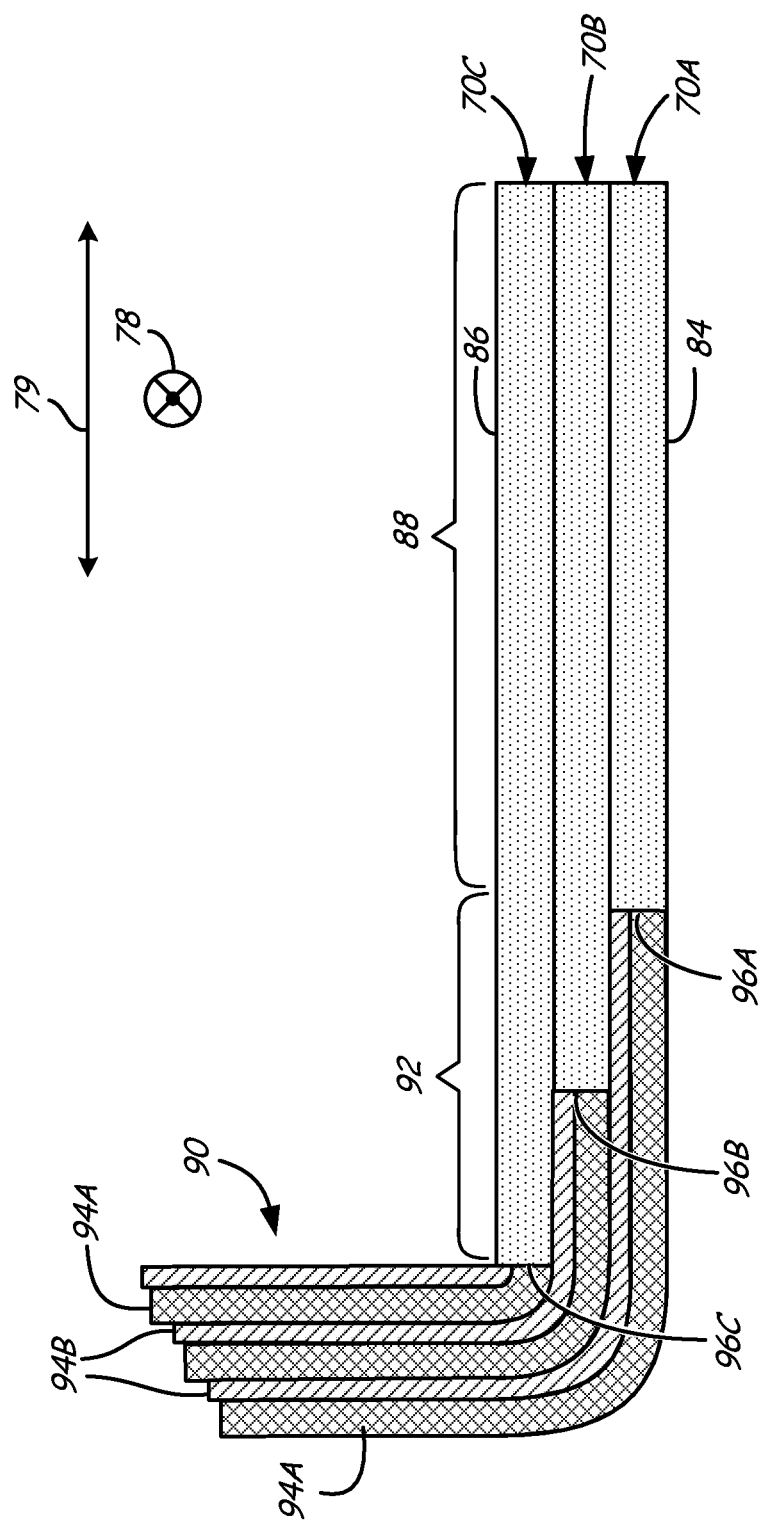
FIG. 3B illustrates the braided fabric preform with the flanged portion upturned.

FIG. 3A shows an example of a wrapped fabric preform 80 for use in forming a composite case, and also includes wraps 70A, 70B, 70C, component circumferential direction 78, component axial direction 79, wall inner surface 84, wall outer surface 86, preform body section 88, preform flange section 90, preform transition section 92, first biaxial layers 94A, and second biaxial layers 94B. FIG. 3B shows wrapped preform 80 with upturned preform flange section 90 and preform transition section 92 adjacent preform body section 88.

FIG. 3A shows an example fabric wrapped preform 80 for use in forming an example embodiment of composite case 62. For illustrative purposes, preform 80 includes three wraps 70A, 70B, 70C between wall inner surface 84 and wall outer surface 86. Wrap 70A in this example corresponds to the inner diameter of case 62 while wrap 70C corresponds to the outer diameter. It will be understood that many embodiments will have more than three wraps, but only three wraps are shown so as to simplify the various illustrations.

Figure 4A:
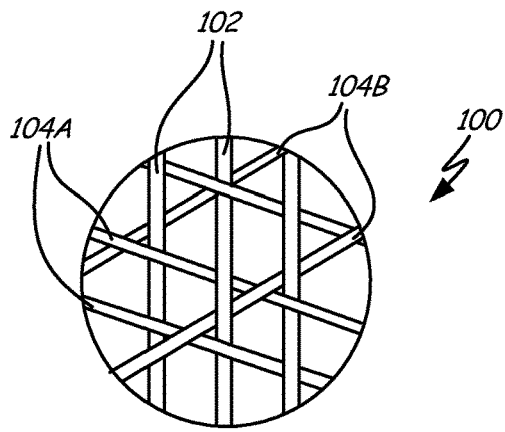
FIG. 4A is a schematic depiction of triaxially braided fabric.
Figure 4B:
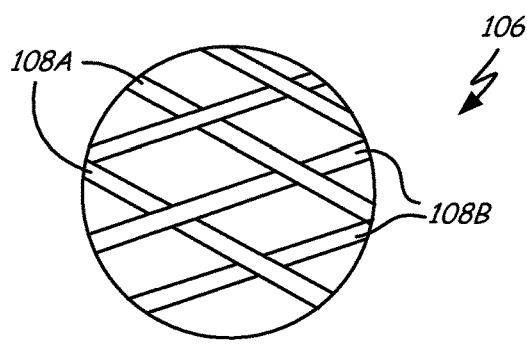
FIG. 4B shows one type of biaxially braided fabric.
Figure 4C:
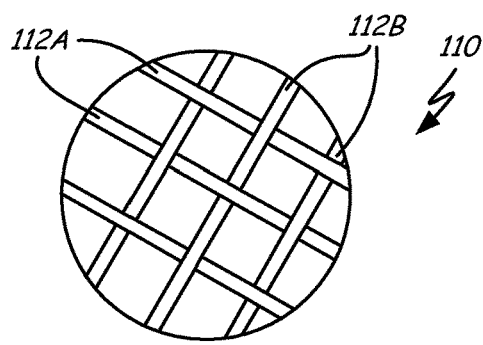
FIG. 4C shows another type of biaxially braided fabric.

Wrapped fabric preform 80 is divided into preform body section 88, preform flange section 90, and preform transition section 92, each corresponding to respective component body section 64, component flange section 66, and component transition section 68 (shown in FIGS. 2A and 2B). Body preform section 88 comprises a plurality of axial tows braided with at least a plurality of first bias tows and a plurality of second bias tows (shown in FIG. 4A). As noted above, the axial tows in preform body section 88 can be configured generally around the circumference of the component by arranging the axial direction of preform 80 to generally align with component circumferential direction 78. This can increase hoop strength of the finished component. Examples of axial and bias tows are shown in FIGS. 4A-4C.

To allow component flange section 66 to be formed integrally with body section 64, preform flange section 90 does not include axial tows. Preform flange section 90 can then be reinforced by additional bias tows as explained below. In certain embodiments, such as is shown in this example, component transition section 68 is shown with preform transition section 92 where each wrap 70A, 70B, 70C has an interface between preform body section 88 and preform flange section 90 respectively formed with and without axial tows. Preform transition section 92 can be formed to have adjacent interfaces transversely offset from each other for each radially adjacent wrap 70A, 70B, 70C.

In this example, preform flange section 90 includes first biaxial layers 94A and second biaxial layers 94B each formed as part of one wrap 70A, 70B, 70C. For each wrap 70A, 70B, 70C, first biaxial layer 94A is defined by first and second bias tows extending from preform body section 88 into preform flange section 90. This allows for a flanged component with an integral flange and no breaks between the flange and the body section. Second biaxial layer(s) 94B can be added to preform sheet 80 prior to wrapping and consolidation in order to reinforce preform flange section 90 and the resulting component flange section 66. In this example, first biaxial layer is oriented respectively at angles measuring about 60° and about −60° relative to an axial direction of the sheet, while second biaxial layer 94B is oriented respectively at angles measuring about 30° and about −30° relative to an axial direction of the sheet. This can be seen in FIGS. 4A-4C.

FIG. 3B shows wrapped preform 80 with preform flange section 90 and preform transition section 92 upturned to eventually form the component flange section 68 (shown in FIGS. 2A and 2B). This may be done, for example using a mandrel to layer the wraps 70A, 70B, 70C, then upturn preform flange section 90 and optionally preform transition section 92.

As noted above, with axial tows in the preform flange and transition sections, wrapped preform 80 would experience too much strain with the increased radial dimension of the flange. Adding a separate composite flange segment after formation of the cured component body introduces localized stresses and weakness. Merely removing the axial tows in these sections weakens the flange, while adding axial tows after upturning the flange section is more complex and makes the part more prone to defects.

In contrast, second biaxial layer 94B reinforces the first integral biaxial layer 94A in preform flange section 90 as well as optional preform transition section 92. In preform transition section 92, interfaces 96A, 96B, 96C between preform body section 88 and preform flange section 90 are offset from one another in the component axial direction. In this example, inner flange 70C has a wider two-layer section as compared to inner flange 70A such that the curvature in preform transition section 92 experiences reduced strain on the bias tows when the flange is turned, such as on the mandrel.

FIGS. 4A-4C depict example arrangements of tows that can be used respectively for preform body section 88, first biaxial layer 94A, and second biaxial layer 94B shown in FIGS. 3A and 3B. FIGS. 5A-5D illustrate the results of steps of a method for forming an example unwrapped fabric preform sheet for a flanged component (e.g., wrapped preform 80 shown in FIGS. 3A-3B) from a triaxially braided sheet of fabric.

FIG. 4A shows triaxial fabric 100, with axial tows 102, first bias tows 104A, and second bias tows 104B. Triaxial fabric 100 is braided to have respective pluralities of first and second bias tows 104A, 104B braided at about a 60° bias in either direction relative to axial tows 102. This arrangement is known as −60°/0°/60°. In this particular example of −60°/0°/60° triaxial fabric, each tow, or bundle of individual fibers, is approximately 60° offset from each adjacent tow when viewed normal to the sheet as shown in FIG. 4A. Thus it will be apparent that any plurality of parallel tows in this example can be considered axial tow 102 and aligned with the circumferential direction of the component as described above, then those disposed about 60° clockwise relative to axial tows 102 can be first bias tows 104A, while second bias tows 104B are generally braided to be about 60° counter-clockwise, or −60° relative to axial tows 102. It will also be appreciated that axial tows 102 may not be precisely aligned with the component circumferential direction, but in certain cases may be slightly offset by several degrees from the component circumferential direction. One reason can be in order to accommodate noncylindrical (e,g, frustoconical) arrangements of the tubular body section.

FIG. 4B shows first biaxial fabric 106, with first bias tows 108A and second bias tows 108B. Here, the first and second bias tows are also braided at about a 60° bias in either direction relative to an axial direction. However, fabric 106 is missing axial (0°) tows with first and second bias tows 108A, 108B offset by about 120° relative to each other. This arrangement is known as −60°/60°, and can be arranged such that first and second bias tows 108A, 108B are offset about 60° respectively from the axial fabric direction and the component circumferential direction. In certain embodiments, such as is described in FIGS. 5A and 5C below, the first and second (−60° and 60°) bias tows of first biaxial fabric 106 can be contiguous with first and second (−60° and 60°) bias tows 104A, 104B of triaxial fabric 100 such that the first braided flange layer and the first braided transition layers are defined by first and second bias tows extending into these sections.

FIG. 4C shows second biaxial fabric 110, with third bias tows 112A and fourth bias tows 112B. In this example, the first and second bias tows are braided about 60° apart, or at about a 30° bias in either direction relative to an axial direction (0°). However, fabric 110 is also missing axial (0°) tows. This arrangement is known as −30°/30°, where third bias tows 112A are approximately 30° clockwise from the axial direction of the fabric, and fourth bias tows 112B are braided about 30° counterclockwise. In certain embodiments, third and fourth bias tows 112A, 112B can be used to reinforce first and second bias tows 108A, 108B. For example, as described in FIGS. 5B and 5C below, third and fourth (−30° and 30°) bias tows 112A, 112B of second biaxial fabric 110 can reinforce first and second (−60° and 60°) bias tows 108A, 108B.

Figure 5D:
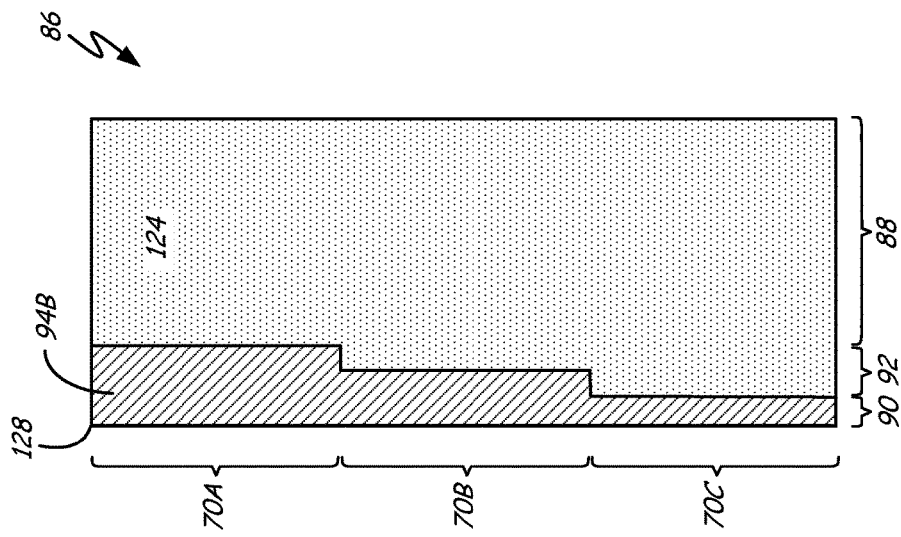
FIG. 5D illustrates the first sheet of fabric having a first portion reinforced by the second fabric sheet.

FIGS. 5A-5D illustrates various steps of making a preform for a flanged composite component. FIG. 5A depicts a first article of fabric 120, such as a sheet, laid out prior to wrapping. This sheet can form the basis of a wrapped fabric preform for a flanged component, such as wrapped preform 80 shown in FIGS. 3A and 3B.

The relative positions of what will become preform body section 88, preform flange section 90, and preform transition section 92 are delineated here. Sheet 120 can initially have uniform triaxially braided tows throughout all of what will become preform sections 88, 90, 92 in the final wrapped preform 80. The triaxial braid may be, in a non-limiting example, arranged in an orientation such as −60°/0°/60° as is shown in FIG. 4A. In this non-limiting example, orientation of sheet 120 with axial tows 102 (0°) along an axial direction of the sheet allows axial tows 102 to be arranged generally along the component circumferential (hoop) direction 78 (as shown in FIG. 2A). The horizontal or transverse orientation of sheet 120 corresponds generally to an axial dimension 79 of the composite component (e.g., case 62 shown in FIG. 2A). Thus, first article of fabric 120 has a width transverse to the axial tows that is equal to or greater than a sum of a longitudinal dimension of a corresponding component body section 64, a radial dimension of a corresponding component flange section 66, and a length of an optional transition section 68 linking the component body section 64 and flange section 66. The vertical dimension of sheet 120 is divided into three contiguous wraps 70A, 70B, 70C, each wrap corresponding roughly to one circumferential dimension of wraps 70A, 70B, 70C shown in FIG. 3B.

FIG. 5B shows the result of a process step where axial tows (e.g., axial tows 102 in FIG. 4A) is removed from a portion of the sheet 120. This leaves behind a first portion 122 and second portion 124. First portion 122 is a biaxial braided region absent axial tows. At this stage, first portion 122 includes only a first layer 94A of biaxial −60°/60° fabric in preform flange section 90 and optional preform transition section 92. With the example fabrics described above, axial tows 102 are removed from the −60°/0°/60° fabric shown in FIG. 4A, and thus first fabric portion 122 now resembles first biaxial fabric 106 shown in FIG. 4B. Second portion 124 however, can remain contiguous with axial tows 102, such that bias braids of the first layer 94A remain contiguous with bias braids of the triaxial fabric in the second portion 124, which corresponds to preform body section 88.

Figure 5C:
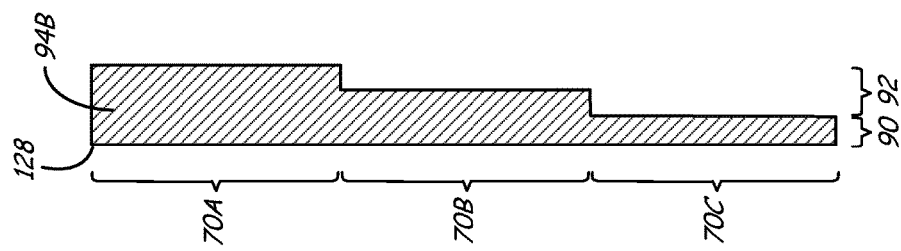
FIG. 5C shows a second sheet of biaxially braided fabric.

FIG. 5C next shows a second, separate biaxially braided sheet 128, which can conform generally to first fabric portion 122. Second sheet 128 is for example, biaxially braided −30°/30° fabric without axial tows as shown in FIG. 4C. In FIG. 5D, second sheet 128 can then be temporarily secured, such as by a thermoplastic thread (not shown), along first fabric portion 122 to form a reinforced first fabric portion 122' comprising first and second biaxial layers 94A, 94B. The finished preform sheet as shown in FIG. 5D now includes a reinforced first portion 122' with two alternating layers 94A, 94B each with at least two braided bias tows absent axial tows. Second portion 124 has triaxially braided fabric including axial tows. The thermoplastic thread may be substituted by any other temporary retention article that dissolves, vaporizes, or is otherwise removed. The retention article can also be permanent so long as it is unobtrusive and does not interfere with use of the finished product.

Once the completed preform sheet is finished, it can then be arranged and wrapped such that the axial tows are aligned with a circumferential direction of the component. To complete the case or other flanged component, the unwrapped fabric preform shown in FIG. 5D can be wrapped and secured over a mandrel (not shown). The mandrel or other forming tool having a portion for upturning the flange section relative to the body section in the manner shown in FIGS. 3A and 3B. The wrapped preform can then be impregnated with an uncured matrix composition. The impregnated preform is cured to form a composite case precursor, which is then processed, such as by machining, into a final composite case.

While this example has been described with respect to three wraps 70A, 70B, 70C, this is merely illustrative. It will be appreciated that many embodiments of a fabric preform sheet will contain different numbers of wraps 70 customized to the needs of a particular flanged component such as case 62. For example, the axial dimension of a single wrap 70A, 70B, 70C need not be exactly equal to the local circumferential dimension of the component. If, for example, the axial dimensions of adjacent wraps 70A, 70B were identical to the local circumferential dimension of the component, the interface between adjacent wraps would end up at the same circumferential location around preform transition region 92. In some cases, this can cause localized weakening of the flange. Thus the axial dimension of wraps 70A, 70B, 70C may alternatively be greater or less than the local circumferential component dimension, such that the interfaces between adjacent wraps (e.g., wraps 70A and 70B) are not directly adjacent in the component radial direction.

Discussion of Possible Embodiments

The following are non-exclusive descriptions of possible embodiments of the present disclosure.

A fabric preform for a composite component according to an exemplary embodiment of this disclosure, among other possible things, includes a preform body section and a preform flange section. The preform body section includes a plurality of axial tows aligned along an axial direction of the preform. The axial tows are braided with at least a plurality of first bias tows and a plurality of second bias tows. The preform flange section includes a first braided flange layer and a second braided flange layer. The first braided flange layer is defined by the first and second bias tows of the preform body section extending into the preform flange section, neither the first nor second braided flange layers having axial tows.

The fabric preform of the preceding paragraph can optionally include, additionally and/or alternatively, any one or more of the following features, configurations and/or additional components:

A further embodiment of the foregoing fabric preform, wherein the axial direction of the preform generally corresponds to a component circumferential direction.

A further embodiment of any of the foregoing fabric preforms, wherein the preform body section comprises triaxially braided fabric with the first bias tows oriented at an angle measuring about 60° relative to the axial direction of the preform, and the second bias tows oriented at an angle measuring about −60° relative to the axial direction of the preform.

A further embodiment of any of the foregoing fabric preforms, wherein the second braided flange layer comprises biaxially braided fabric with a plurality of third bias tows and a plurality of fourth bias tows.

A further embodiment of any of the foregoing fabric preforms, wherein the plurality of third bias tows are oriented at an angle measuring about 30° relative to an axial direction of the preform, and the plurality of fourth bias tows are oriented at an angle measuring about −30° relative to the axial direction of the preform sheet.

A further embodiment of any of the foregoing fabric preforms, wherein the fabric preform further comprises a preform transition section including a first braided flange layer defined by the first and second bias tows of the preform body section extending into the preform transition section.

A further embodiment of any of the foregoing fabric preforms, wherein the first braided flange layer of the preform transition section does not have axial tows.

A further embodiment of any of the foregoing fabric preforms, wherein the preform transition section comprises a second braided transition layer extending into the second braided flange layer.

A further embodiment of any of the foregoing fabric preforms, wherein the preform includes a plurality of axially contiguous wraps, each wrap comprising a braid interface disposed transversely between the preform body section and the preform transition section, each braid interface circumferentially offset from radially adjacent braid interfaces.

A gas turbine engine component according to an exemplary embodiment of this disclosure, among other possible things, includes a tubular body section and a flange section. The tubular body section includes a plurality of fiber wraps encompassed within a matrix composition. The plurality of body section fiber wraps each include a plurality of axial tows braided with at least a plurality of first bias tows and a plurality of second bias tows. The axial tows are generally aligned along a component circumferential direction. The flange section includes a plurality of fiber wraps encompassed within the matrix composition, and each include a first braided flange layer and a second braided flange layer. The first braided flange layer is defined by at least the first and second bias tows of the body section. Neither the first nor second braided flange layers have axial tows.

The gas turbine engine component of the preceding paragraph can optionally include, additionally and/or alternatively, any one or more of the following features, configurations and/or additional components:

A further embodiment of the foregoing gas turbine engine component, wherein the flange section is upturned relative to the body section such that a flange section outer diameter is greater than a body section outer diameter.

A further embodiment of any of the foregoing gas turbine engine components, wherein the component is a fan containment case.

A further embodiment of any of the foregoing gas turbine engine components, wherein the second braided flange layer includes a plurality of third bias tows braided with a plurality of fourth bias tows.

A further embodiment of any of the foregoing gas turbine engine components, wherein the component further comprises a transition section including a plurality of braid interfaces disposed at a flange end of the body section, each braid interface circumferentially offset from radially adjacent braid interfaces.

A method for making a fabric preform for a composite component according to an exemplary embodiment of this disclosure, among other possible things, includes laying out a first article of fabric having a plurality of axial tows braided with a plurality of first bias tows and a plurality of second bias tows. Axial tows are removed from a first portion of the first article of fabric, leaving the first fabric portion braided absent an axial tow, and a second fabric portion braided with axial tows. A second article of fabric is disposed along to the first article of fabric along the first fabric portion to form a reinforced first fabric portion, the second article of fabric absent an axial tow, such that the reinforced first fabric portion includes a first braided layer and a second braided layer each absent an axial tow.

The method of the preceding paragraph can optionally include, additionally and/or alternatively, any one or more of the following features, configurations and/or additional components:

A further embodiment of the foregoing method further comprises arranging the first article of fabric such that the axial tow in at least the second fabric portion is substantially aligned with a circumferential orientation of the composite component.

A further embodiment of any of the foregoing methods, wherein the first article of fabric comprises a plurality of wraps, an axial dimension of each wrap being approximately equal to a local circumferential dimension of the component.

A further embodiment of any of the foregoing methods, wherein the reinforced first fabric portion defines a preform flange section.

A further embodiment of any of the foregoing methods, wherein the first article of fabric is contiguous triaxially braided fabric with the at least two bias tows oriented respectively at angles measuring about 60° and about −60° relative to the axial tow.

A further embodiment of any of the foregoing methods, wherein the two bias tows of the second article of fabric are oriented respectively at angles measuring about 30° and about −30° relative to the axial tow of the first article of fabric.

A method for making a composite case according to an exemplary embodiment of this disclosure, among other possible things, includes forming a fabric preform according to any of the foregoing methods for making a fabric preform. The fabric preform is secured over a mandrel, the mandrel including a portion for upturning the flange section relative to the body section. The preform is impregnated with an uncured matrix composition. The impregnated preform is cured to form a composite case precursor. The composite case precursor is processed into a final composite case.

A fan containment case for a gas turbine engine according to an exemplary embodiment of this disclosure, among other possible things, includes manufacturing the case according any of the foregoing methods.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine component comprising:
    a plurality of fiber wraps encompassed within a matrix composition;
    a body section including a plurality of body section fiber wrap portions formed into a tubular shape and encompassed within the matrix composition, the plurality of body section fiber wrap portions each including a plurality of axial tows braided with at least a plurality of first bias tows and a plurality of second bias tows, the body section fiber wrap portions arranged such that at least some of the plurality of axial tows are generally aligned along a component circumferential direction;
    a flange section including a plurality of flange section fiber wrap portions encompassed within the matrix composition, the plurality of flange section fiber wrap portions each including a first braided flange layer and a second braided flange layer, the first braided flange layer defined by at least first and second bias tows connected to the first and second bias tows of the body section, neither the first nor second braided flange layers having axial tows; and
    a transition section including a plurality of braid interfaces disposed at a flange end of the body section, each braid interface circumferentially offset from radially adjacent braid interfaces.

2. The gas turbine engine component of claim 1, wherein the flange section is upturned relative to the body section such that a flange section outer diameter is greater than a body section outer diameter.

3. The gas turbine engine component of claim 1, wherein the component is a fan containment case.

4. The gas turbine engine component of claim 1, wherein the second braided flange layer includes a plurality of third bias tows braided with a plurality of fourth bias tows.

5. The gas turbine engine component of claim 1, wherein the transition section comprises:
    a first braided transition layer connecting the first body section to at least the first braided flange layer;
    wherein at least a portion of the first braided transition layer does not have axial tows.

6. The gas turbine engine component of claim 5, wherein the transition section further comprises a second braided transition layer extending into the second braided flange layer.

7. The gas turbine engine component of claim 4, wherein the plurality of third bias tows are oriented at an angle measuring about 30° relative to an axial direction, and the plurality of fourth bias tows are oriented at an angle measuring about −30° relative to the axial direction of the plurality of fiber wraps.

8. The turbine engine component of claim 1, wherein the body section fiber wrap portions each comprise triaxially braided fabric with the first bias tows oriented at an angle measuring about 60° relative to the axial tows, and the second bias tows oriented at an angle measuring about −60° relative to the axial tows.

9. The turbine engine component of claim 8, wherein the first braided flange layer comprises a portion of the triaxially braided fabric with the axial tows removed therefrom.

10. A method comprising:
    providing a fabric preform comprising:
        a plurality of fiber wraps each including at least a body section fiber wrap portion, a transition section fiber wrap portion, and a flange section fiber wrap portion, each body section fiber wrap portion including a plurality of axial tows braided with at least a plurality of first bias tows and a plurality of second bias tows, each transition section fiber wrap portion including at least a plurality of braid interfaces disposed at a flange end, and each flange section fiber wrap portion including at least a first braided flange layer and a second braided flange layer, neither the first nor second braided flange layers having axial tows, the first braided flange layer defined by at least first and second bias tows;
    securing the fabric preform with the body section fiber wrap portions formed into a tubular shape, and with the plurality of axial tows aligned generally along a component circumferential direction to define a body section of the fabric preform;
    upturning the flange section fiber wrap portions proximate to the transition section fiber wrap portions relative to the body section to define a flange section of the fabric preform, and to define a transition section at a flange end of the body section;
    impregnating the fabric preform with an uncured matrix composition; and
    curing the impregnated preform to form a composite case or a precursor thereof, such that the body section, the transition section, and the flange section are encompassed within the matrix composition.

11. The method of claim 10, wherein the first and second bias tows of the body section fiber wrap portion are oriented respectively at angles measuring about 60° and about −60° relative to the axial tow.

12. The method of claim 10, wherein the first and second bias tows of the flange section fiber wrap portion are contiguous with the first and second bias tows of the body section fiber wrap portion.

13. The method of claim 12, wherein a first article of fabric defines the first and second bias tows of the flange section fiber wrap portion contiguous with the first and second bias tows of the body section fiber wrap portion.

14. The method of claim 10, wherein the second braided flange layer includes a plurality of third bias tows braided with a plurality of fourth bias tows, the third and fourth bias tows biased relative to each other and biased relative to the first and second bias tows.

15. The method of claim 10, wherein:
providing the fabric preform comprises the steps of:
  providing a plurality of first articles of fabric each comprising a first triaxial braid including a plurality of axial tows, a plurality of first bias tows, and a plurality of second bias tows;
  removing at least one of the plurality of axial tows from each first article of fabric to define a plurality of modified first articles of fabric, leaving a first portion and a second portion of each modified first article of fabric, such that the first portion includes a first braided layer having first bias tows braided with second bias tows, absent axial tows, and the second portion includes first bias tows and second bias tows braided with axial tows;
  reinforcing the first portion of each modified first article of fabric with one of a plurality of second articles of fabric each comprising a biaxial braid absent an axial tow, each second article of fabric defining a second braided flange layer; and
  alternately stacking ones of the modified first articles of fabric and ones of the second articles of fabric.

16. The method of claim 15, wherein the second braided flange layer includes a plurality of third bias tows braided with a plurality of fourth bias tows, the third and fourth bias tows biased relative to each other and biased relative to the first and second bias tows.

17. A gas turbine engine component comprising:
  a plurality of fiber wraps encompassed within a matrix composition;
  a body section including a plurality of body section fiber wrap portions formed into a tubular shape and encompassed within the matrix composition, the plurality of body section fiber wrap portions each including a plurality of axial tows braided with at least a plurality of first bias tows and a plurality of second bias tows, the body section fiber wrap portions arranged such that at least some of the plurality of axial tows are generally aligned along a component circumferential direction; and
  a flange section including a plurality of flange section fiber wrap portions encompassed within the matrix composition, the plurality of flange section fiber wrap portions each including a first braided flange layer and a second braided flange layer, the first braided flange layer defined by at least first and second bias tows connected to the first and second bias tows of the body section, neither the first nor second braided flange layers having axial tows;
  wherein the second braided flange layer includes a plurality of third bias tows braided with a plurality of fourth bias tows; and
  wherein the plurality of third bias tows are oriented at an angle measuring about 30° relative to an axial direction, and the plurality of fourth bias tows are oriented at an angle measuring about −30° relative to the axial direction of the plurality of fiber wraps.

18. The gas turbine engine component of claim 17, wherein the flange section is upturned relative to the body section such that a flange section outer diameter is greater than a body section outer diameter.

19. The gas turbine engine component of claim 17, wherein the component is a fan containment case.

20. The gas turbine engine component of claim 17, wherein the second braided flange layer includes a plurality of third bias tows braided with a plurality of fourth bias tows.

21. The gas turbine engine component of claim 17, wherein the transition section comprises:
  a first braided transition layer connecting the first body section to at least the first braided flange layer;
  wherein at least a portion of the first braided transition layer does not have axial tows.

22. The gas turbine engine component of claim 21, wherein the transition section further comprises a second braided transition layer extending into the second braided flange layer.

23. The gas turbine engine component of claim 17, wherein the body section fiber wrap portions each comprise triaxially braided fabric with the first bias tows oriented at an angle measuring about 60° relative to the axial tows, and the second bias tows oriented at an angle measuring about −60° relative to the axial tows.

24. The turbine engine component of claim 23, wherein the first braided flange layer comprises a portion of the triaxially braided fabric with the axial tows removed therefrom.

* * * * *